(12) United States Patent
Sherrill et al.

(10) Patent No.: US 11,891,169 B2
(45) Date of Patent: Feb. 6, 2024

(54) INSERT FOR A BLADE OF A ROTARY-WING AIRCRAFT

(71) Applicant: Bell Textron Inc., Fort Worth, TX (US)

(72) Inventors: Paul Branson Sherrill, Grapevine, TX (US); Robert Alan Self, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 560 days.

(21) Appl. No.: 16/563,732

(22) Filed: Sep. 6, 2019

(65) Prior Publication Data
US 2021/0070433 A1    Mar. 11, 2021

(51) Int. Cl.
| | |
|---|---|
| *B64C 27/473* | (2006.01) |
| *F01D 5/14* | (2006.01) |
| *B64F 5/10* | (2017.01) |
| B29K 705/08 | (2006.01) |
| B29C 70/48 | (2006.01) |
| B29L 31/08 | (2006.01) |

(52) U.S. Cl.
CPC .............. *B64C 27/473* (2013.01); *B64F 5/10* (2017.01); *F01D 5/147* (2013.01); *B29C 70/48* (2013.01); *B29K 2705/08* (2013.01); *B29L 2031/082* (2013.01); *B64C 2027/4733* (2013.01); *F05D 2230/50* (2013.01); *F05D 2300/2263* (2013.01); *F05D 2300/44* (2013.01)

(58) Field of Classification Search
CPC ......... B64C 11/16; B64C 11/20; B64C 11/22; B64C 11/24; B64C 27/008; B64C 27/028; B64C 17/02; F16F 15/32

USPC ............................ 416/224, 226, 233, 229 R
See application file for complete search history.

(56) References Cited

U.S. PATENT DOCUMENTS

| | | | | |
|---|---|---|---|---|
| 3,323,597 A | * | 6/1967 | Lougobardi | .......... B64C 27/473 416/144 |
| 3,999,888 A | * | 12/1976 | Zincone | ................ B64C 27/008 416/224 |
| 4,078,422 A | * | 3/1978 | Brunsch | ................ B64C 27/008 416/61 |
| 4,079,903 A | * | 3/1978 | Ashton | ...................... B64C 3/00 416/241 A |
| 4,494,910 A | * | 1/1985 | Hahn | .................... F03D 1/0675 156/172 |
| 4,806,077 A | * | 2/1989 | Bost | ....................... B64C 27/473 416/144 |
| 5,145,320 A | * | 9/1992 | Blake | ....................... F04D 29/32 416/241 A |
| 6,035,531 A | * | 3/2000 | Besse | ..................... B64C 27/473 29/889.6 |
| 6,056,838 A | * | 5/2000 | Besse | ....................... B29C 70/48 156/75 |

(Continued)

*Primary Examiner* — John Kwon
(74) *Attorney, Agent, or Firm* — Pramudji Law Group PLLC; Ari Pramudji

(57) ABSTRACT

In an implementation, a rotor blade (alternatively referred to herein as "blade") for a helicopter or other aircraft may include an outer layer. The outer layer may define a cavity. The outer layer may at least partially correspond to an airfoil, e.g., a wing. One or more inserts may be included within the cavity and be encompassed thereby. The first insert may have a density of at least 0.6 pounds per cubic inch.

16 Claims, 5 Drawing Sheets

(56) References Cited

U.S. PATENT DOCUMENTS

| | | | | |
|---|---|---|---|---|
| 6,231,941 | B1* | 5/2001 | Cundiff | B29C 70/443 |
| | | | | 57/232 |
| 8,186,057 | B2* | 5/2012 | Harrison | F01D 5/027 |
| | | | | 29/889 |
| 8,882,464 | B2* | 11/2014 | Smith | B64C 11/24 |
| | | | | 416/145 |
| 9,139,297 | B1* | 9/2015 | White | B64C 11/06 |
| 9,249,851 | B2* | 2/2016 | Gill, III | B64C 27/008 |
| 9,487,290 | B2* | 11/2016 | Sherrill | B64C 27/473 |
| 2002/0187047 | A1* | 12/2002 | Rinke | B64C 27/473 |
| | | | | 416/229 R |
| 2008/0159870 | A1* | 7/2008 | Hong | F04D 29/644 |
| | | | | 416/224 |
| 2009/0189325 | A1* | 7/2009 | Callis | B29C 70/32 |
| | | | | 29/889.71 |
| 2012/0156050 | A1* | 6/2012 | White | B64C 27/18 |
| | | | | 29/889.1 |
| 2012/0163981 | A1* | 6/2012 | Hong | B29C 73/26 |
| | | | | 156/278 |
| 2014/0133993 | A1* | 5/2014 | Gill, III | B64C 27/008 |
| | | | | 156/64 |
| 2014/0271215 | A1* | 9/2014 | Measom | B23P 15/04 |
| | | | | 29/889.71 |
| 2015/0298802 | A1* | 10/2015 | Reveillon | F01D 5/147 |
| | | | | 416/229 R |
| 2019/0061930 | A1* | 2/2019 | Hampton | B64C 27/06 |
| 2021/0078699 | A1* | 3/2021 | Sherrill | B64C 27/008 |

* cited by examiner

INSERT FOR A BLADE OF A ROTARY-WING AIRCRAFT

STATEMENT REGARDING FEDERALLY SPONSORED RESEARCH OR DEVELOPMENT

Not applicable.

BACKGROUND

This section is intended to provide background information to facilitate an understanding of various technologies described herein. It should be understood that the statements in this section are not to be read as admissions of prior art.

Rotary wing aircraft and fixed wing aircraft are heavier-than-air vehicles that create lift and/or thrust using propellers or rotary wing blades. In rotary wing aircraft, rotary wing blades are substantially lightweight. Weights are included inside the rotary wing blade to provide inertia to the rotary wing blades. These weights are often made of lead or a lead-based material. Lead is a relatively flexible material that will conform to the bending and torsional stresses of a rotary wing blade. However, lead weights present environmental problems and are, therefore, undesirable.

SUMMARY

Briefly, particular implementations of claimed subject matter may relate to an aircraft wing, such as a stationary wing utilized by a fixed-wing aircraft or a rotary-wing utilized by a helicopter or tiltrotor aircraft.

In an implementation, a rotary wing blade (alternatively referred to herein as "blade") for a helicopter may include an outer layer. The outer layer may define a cavity. At least one inertia insert may be disposed within the defined cavity. The inertia insert may include a plurality of weight segments and a binding agent surrounding one or more of the plurality of weight segments. The binding agent may separate each weight segment from a neighboring weight segment. One or more of the weight segments may include an alloy having a density of at least about 0.6 pounds per cubic inch.

The binding agent may be an adhesive or a composite resin. The weight segment may include tungsten. A fiber may be included within the binding agent or may be layered around the weight segment. The binding material may have a density of less than about 0.6 pounds per cubic inch and may surround substantially all of the plurality of weight segments.

Another implementation relates to a method of fabricating a blade for a helicopter. The method may include machining one or more of a plurality of weight segments. The weight segment may include a material having a density of at least about 0.6 pounds per cubic inch. The method may also include placing the one or more of the plurality of weight segments inside a cavity that is defined by a surface of a mold. The method may include injecting a binding agent into the defined cavity. The weight segment may be made of tungsten.

The blade may include a plurality of the weight segments. A fiber spacer may separate each of the plurality of weights segments from a neighboring weight segment. The fiber spacer may also overwrap all of the plurality of the weight segments.

BRIEF DESCRIPTION OF THE DRAWINGS

The present technique(s) will be described further, by way of example, with reference to implementations thereof as illustrated in the accompanying drawings. It should be understood, however, that the accompanying drawings illustrate only the various implementations described herein and are not meant to limit the scope of various techniques, methods, systems, or apparatuses described herein.

DETAILED DESCRIPTION

Autorotation is a phenomena in rotary wing aircraft that allows a helicopter to execute a safe landing even after a loss of engine power. Autorotation is possible due to the rotary wing blades (e.g., a main rotor) maintaining motion due to the inertia of rotary wing blades. To achieve a proper amount of inertia, the rotary wing blades should have a significant weight.

In the case of actual engine failure, a clutch mechanism (called a freewheeling unit) disengages the engine from the main rotor allowing the main rotor to rotate freely without resistance from the engine. A pilot adjusts the pitch of the helicopter so that an upward flow of air through the rotary wing blades will spin the main rotor at a particular amount of rotations per minute, which causes a buildup of potential energy in the blades. Upon nearing a safe landing surface, the pilot takes advantage of the potential energy in the blades to execute a safe landing.

Figure 1:
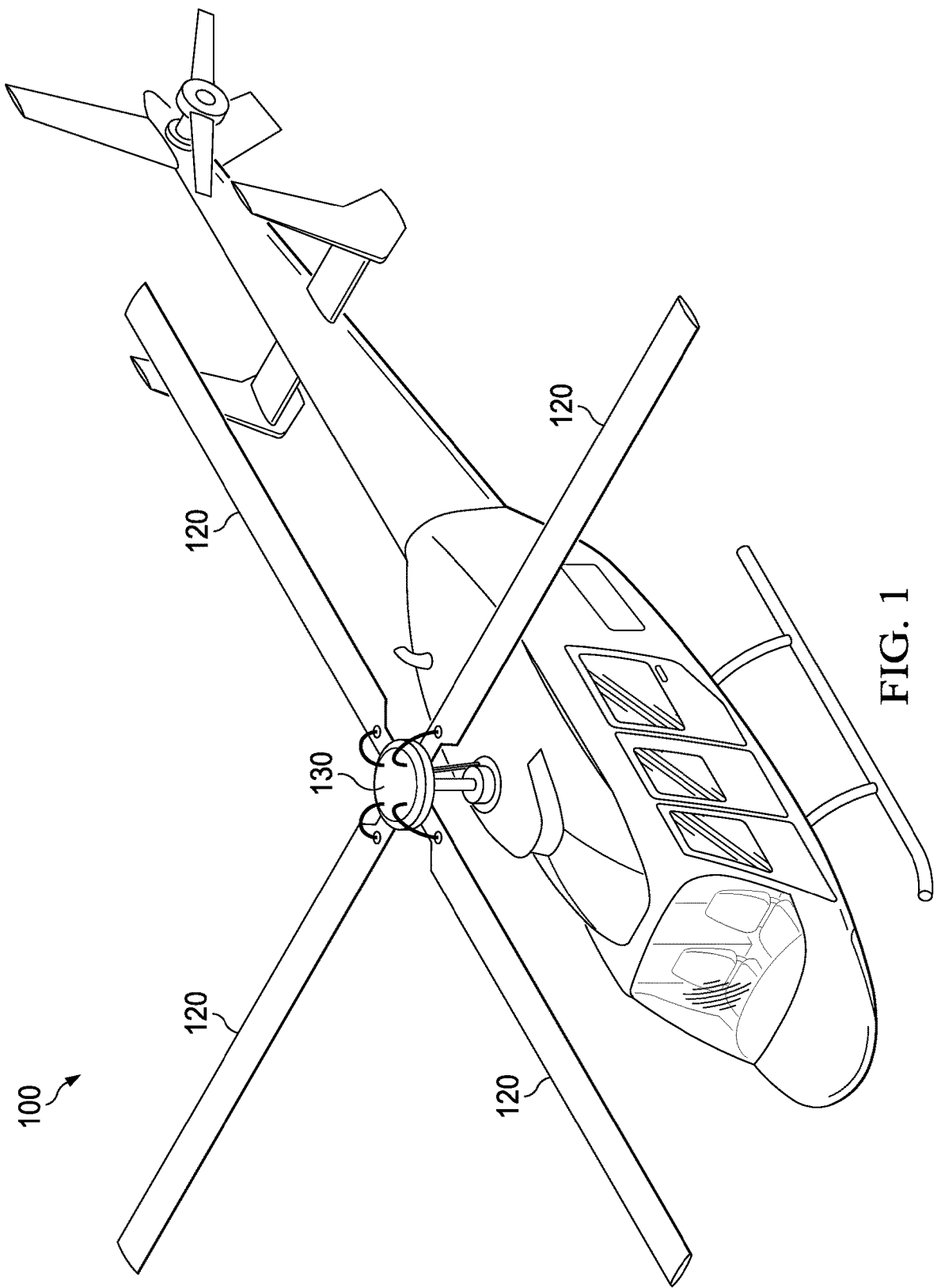
FIG. 1 illustrates a rotary wing aircraft having multiple blades according to an example implementation described herein.

Particular implementations of claimed subject matter will now be described with reference to the figures, such as FIG. 1, which shows a representative aircraft 100. Although representative aircraft 100 shows a rotary-wing aircraft (e.g., a helicopter), implementations of claimed subject matter are not limited to applications of such aircraft types. Rather, claimed subject matter is intended to embrace a variety of aircraft environments, such as commercial or military aircraft utilizing one or more fixed wings, tiltrotor aircraft, commercial and military helicopters, and so forth. Additionally, although representative aircraft 100 is shown to include four rotary wing blades 120, implementations of claimed subject matter may be applied to a mast 130 of an a rotary wing aircraft and inclusive of any number of rotary wing blades 120, such as helicopters or tiltrotor aircraft including two blades, three blades, five blades, and so forth, virtually without limitation.

Figure 2:
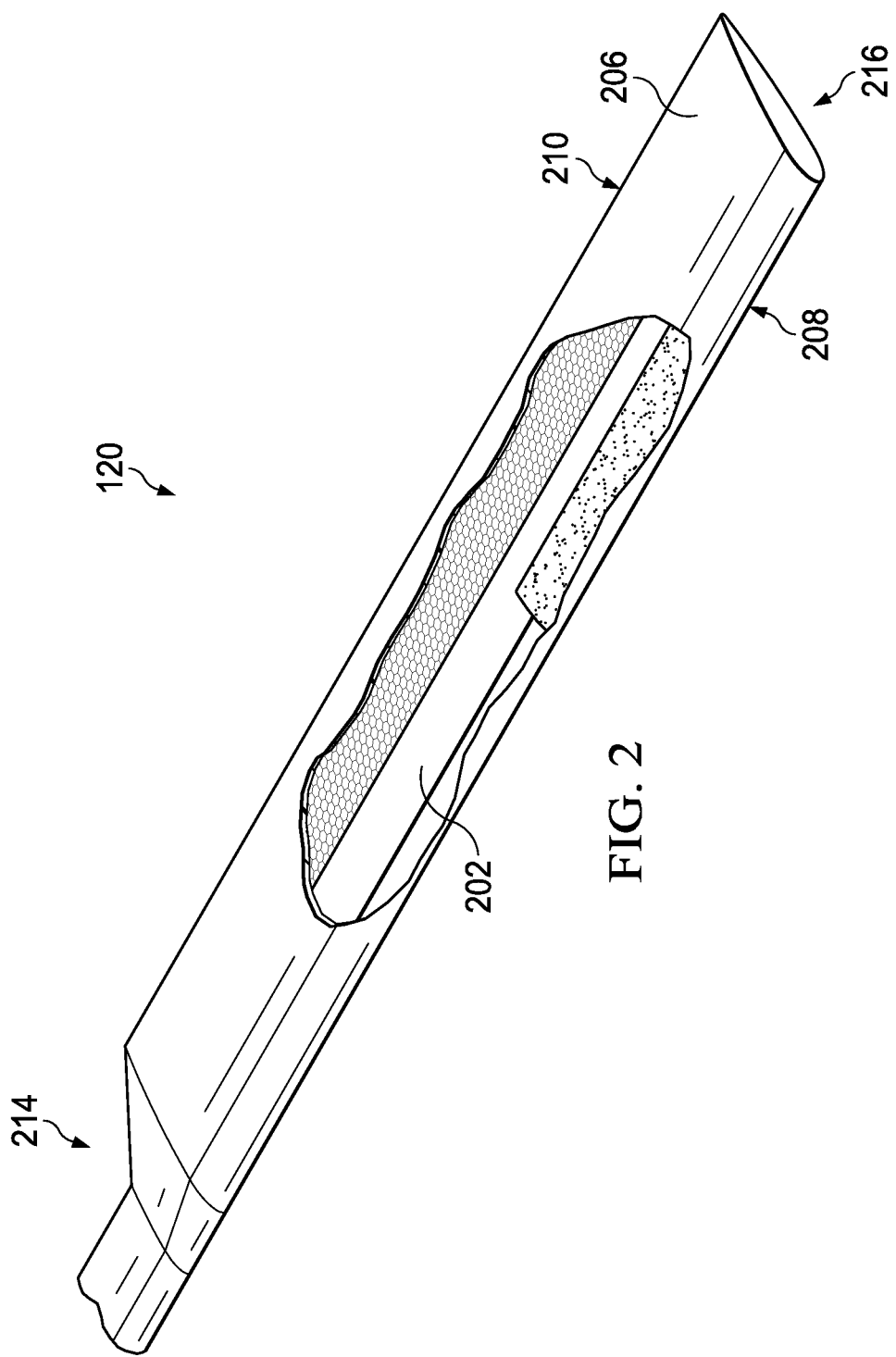
FIG. 2 illustrates a substantial portion of a blade of the rotary wing aircraft according to an example implementation described herein.

FIG. 2 illustrates an example implementation of a blade 120 (alternatively referred to herein as, "rotary wing blade"). As illustrated, rotary wing blade 120 may include a rotary wing spar tube 202 and sheath 206 (e.g., an outer layer). The sheath 206 may include a leading edge region 208, a trailing edge region 210 and a cavity (which is discussed below).

Sheath 206 may be bonded or otherwise affixed to wing spar tube 202 so as to structurally cooperate with wing spar tube 202 in forming an airfoil, thus being capable of providing lift to a rotary- or fixed-wing aircraft, for example. The sheath 206 may be a thin sheet of material that is a few millimeters thick or it may be a thick layer of material having about an inch or two in thickness.

The wing spar tube 202 may be utilized to provide structural support for components of a rotary wing or for components of a fixed wing. As further illustrated in FIG. 2, the rotary wing blade 120 may further include root portion 214 and tip portion 216. In an implementation, such as that of a rotary-wing aircraft, root portion 214 may attach to the mast 130 of the helicopter 100 or may attach to a mast of a tiltrotor aircraft. In another implementation, such as that of a fixed-wing aircraft, root portion 214 may attach to an aircraft fuselage.

The wing spar tube 202 of the rotary wing blade 120 may include a hollow or solid metal shaft, which may provide primary structural support for the remaining components of the rotary wing blade 120. In another implementation, rotary wing blade 120 may be comprised of one or more composite materials, such as carbon fiber. Although not shown in FIG. 2, the rotary wing blade 120 may be attached to other structural and/or control elements of a rotor system, such as a swashplate, pitch link, pitch horn, etc. The rotary wing blade 120 may make other connections and/or couplings to mechanical components of a rotary-wing aircraft, and claimed subject matter is not limited in this respect.

Figure 3:
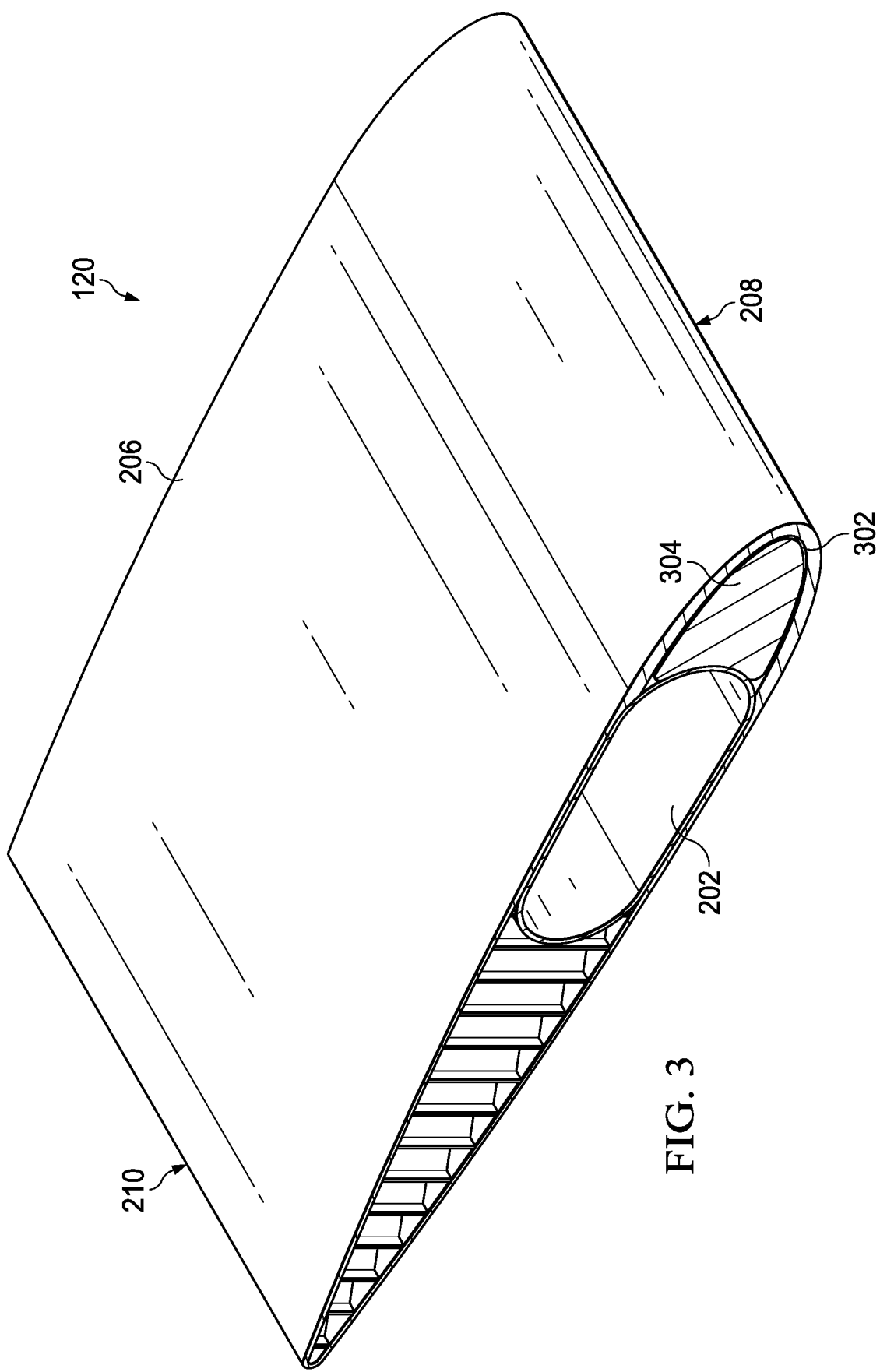
FIG. 3 illustrates a cross-section of the blade according to an example implementation described herein.

FIG. 3 illustrates a cross-section of the rotary wing blade 120 in accordance with one implementation described herein. The rotary wing blade 120 may include a cavity 302. The cavity 302 may include an inertia weight 304 (alternatively referred to herein as a tuning weight). The inertia weight 304 may be heavier than the sheath 206, denser than the sheath 206, or both heavier and denser than the sheath 206.

The rotary wing blade 120 may include a single inertia weight 304 or multiple inertia weights 304. The inertia weight 304 (or plurality of inertia weights) may be in the tip portion 216 of the rotary wing blade 120. The tip portion 216 may be from about twenty to about thirty percent of the length of the blade on the opposite side of the rotary wing blade 120 from the root portion 214. The rotary wing blade 120 from the root portion 214 to the tip portion 216 of the rotary wing blade 120 may be subjected to bending moments that cause the rotary wing blade 120 to flex as a result of lift or other forces. If the rotary wing blade 120 includes a single inertia weight 304, the inertia weight 304 may be capable of flexing with the rotary wing blade 120.

Multiple inertia weights 304 may be used to account for flexing of the rotary wing blade 120. Thus, the weights do not each have to bend, e.g., flex, along with the rotary wing blade 120. The number of inertia weights 304, the size of the inertia weights 304 and the distance between inertia weights 304 may depend on the amount of expected flex of the rotary wing blade 120.

Regardless of whether a single inertia weight 304 is used or whether multiple inertia weights are used, the rotary wing blade 120 may have a center of gravity (hereinafter referred to as "CG") that is forward of the geometric center of the rotary wing blade 120 as opposed to aft of the geometric center of the rotary wing blade 120, thereby improving inertia of the rotary wing blade 120 in the forward direction.

Figure 4B:
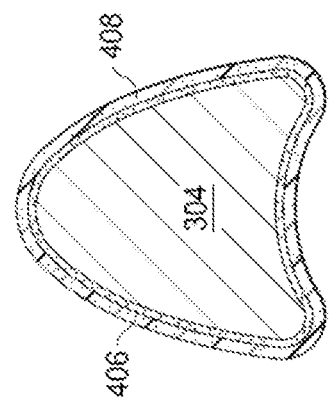
FIG. 4B illustrates a cross-section of a high density inertia weight wrapped in a binding agent and a fiber layer according to an example implementation described herein.
Figure 4A:
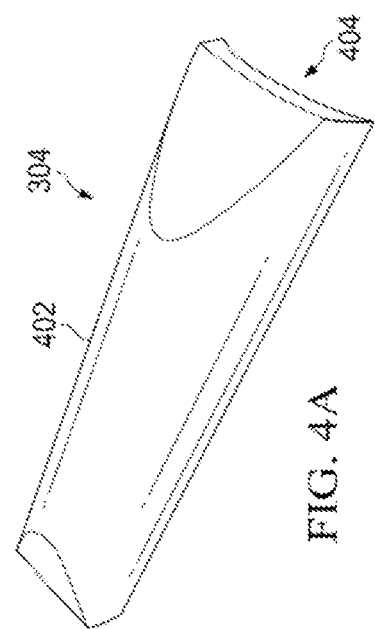
FIG. 4A illustrates a high density inertia weight insert according to an example implementation described herein.

FIG. 4A illustrates an inertia weight 304 in accordance with one implementation described herein. The inertia weight 304 may be any shape or material. For example, the shape of the inertia weight 304 may be consistent with the leading edge of the rotary wing blade 120. The rotary wing blade 120 may have an air foil shape that has cross-section in which the leading edge region 208 is curved and in which the trailing edge 206 is tapered. The inertia weight 304 may have a curved surface 402 that has a profile shaped similarly to that of the leading edge region 208 of the rotary wing blade 120. Thus, the curved surface 402 of the inertia weight 304 may snugly fit into and be encompassed by the leading edge region 208 of the rotary wing blade 120.

An opposing surface 404 of the inertia weight, e.g., the surface opposing the curved surface 402, may have any shape. For example, the opposing surface 404 may be planar, curved, irregular or tapered. The opposing surface 404 may be of a shape that pushes the CG toward the leading edge region 208 of the rotary wing blade 120 such as a crescent moon shape.

FIG. 4B illustrates a cross-section of the rotary wing blade 120. The inertia weight 304 within the rotary wing blade 120 may include a weight segment 414 encompassed by a binding material 406 and an outer layer of fiber. The binding material 406 may be between the weight segment and the fiber layer 408 or between the weight segment 414 and the sheath 206, if the fiber layer is omitted. The binding material 406 may be an adhesive or a composite resin. The fiber may be part of the binding material or may be a prepreg, e.g., a fiber previously impregnated with a resin.

A weight segment 414 may have a dense material. For example, the weight segment 414 may include a material having a density of at least about 0.6 pounds per cubic inch and, preferably, at least about 0.7 pounds per cubic inch. Tungsten, for example, has a density of about 0.615 lb./in$^3$ (about 18 g/cm$^3$). A weight segment that is made of a dense material may reduce the amount of space within the rotary wing blade necessary to house the inertia weight 304. Therefore, other components, e.g., strengthening webs or strengthening spars, electronics, etc., may be included in a location of the blade previously occupied by the inertia weight.

The weight segment 414 of the inertia weight 304 may be any dense material such as tungsten, platinum, iridium, osmium, etc. Some high density materials are highly brittle and, therefore, may not be as beneficial in high bending moment environments such as in helicopter blades. Therefore, the inertia weight 304 may be designed to avoid fracture due to bending. For example, an inertia weight may be smaller than the blade so that it is one to two and a half percent the size of the blade. A blade that is twenty feet long (about six meters), for example, may have an inertia weight that is about six inches long (about 15 centimeters).

Multiple inertia weights may be placed in the rotary wing blade 120 and have the same effect on the blade as a single weight. Fiber spacers may be between the inertia weights 304. In addition to advantages during manufacturing (discussed below), fiber spacers may provide cushioning between inertia inserts thereby protecting more brittle materials, e.g., tungsten, from fracture.

Figure 5:
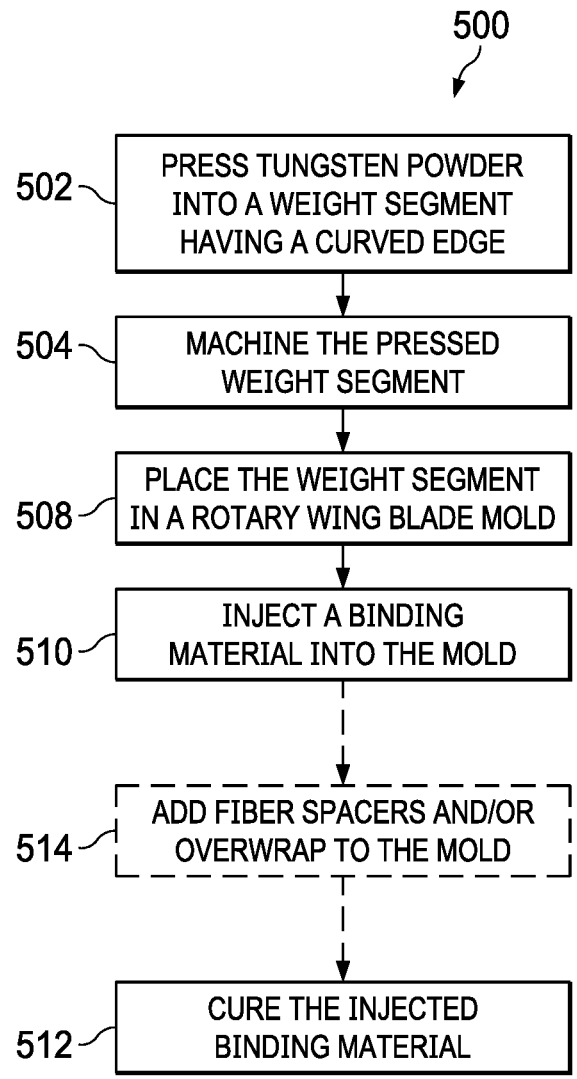
FIG. 5 is a flow chart for a method of fabricating a blade for a rotary wing aircraft having a blade with a high density insert in accordance with an implementation described herein.

FIG. 5 is a flow chart 500 for a method of fabricating an aircraft wing according to an implementation described herein. FIG. 5 may include blocks in addition to those shown and described, fewer blocks or blocks occurring in an order different than may be identified, or any combination thereof. The method may begin at block 502, which may include sintering powdered tungsten into a shape as close to a final usable shape as possible, e.g., pressing tungsten into a usable shape. At step 504, the tungsten may be machined to enhance the tolerance of the tungsten as closely as possible to an intended usable shape as a weight segment.

In another implementation, at step 508, one or more weight segment 414 may be placed in a mold. The mold may be a shape of a rotary wing blade (or fixed wing blade) or some portion of a rotary wing blade (or fixed wing blade). The weight segment may be held in place in the mold with a plurality of positioning tools in the mold.

In another implementation, at step 510, a binding material may be inserted into the mold surrounding the weight segment. At step 512, the binding material may be cured. Curing of the binding material may be through a heat treatment. The binding material may be created via a resin transfer molding (RTM) method, a same qualified resin transfer molding method (SQRTM) and/or a vacuum assisted resin transfer molding method (VARTM). An optional step 514 may include adding fiber to the mold. Step 514 may be executed before or during curing of the binding agent. The fiber may be added between each of the weight segments 414 and/or, if multiple weight segments are used, the fiber may be added as an overwrap around all of the weight segments 414.

The binding material may provide highly accurate tolerances of the insert within the mold. Precision forming methods of the inertia insert are unnecessary. Any imperfections of the inertia insert may be negated by the binding material. An interior surface of the binding material 406, e.g., the surface of the binding material that is in contact with the weight segment 414 of the inertia weight 304, may fill in any cracks or crevices of the weight segment 414. A surface of the binding material opposing the weight segment 414 may precisely conform to the mold for an improved external tolerance of the inertia insert.

Although illustrative implementations of claimed subject matter have been described in detail herein with reference to the accompanying drawings, it is to be understood that the invention is not limited to those precise implementations, and that various changes, additions and modifications can be effected therein by one skilled in the art without departing from the scope of the invention as defined by the appended claims. For example, various combinations of the features of the dependent claims could be made with the features of the independent claims without departing from the scope of claimed subject matter.

Reference is made in the foregoing detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others.

Example implementations are provided so that this disclosure will be thorough, and will fully convey the scope to those who are skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known processes, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example implementations.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Further, it is to be understood that other implementations may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict the scope of claimed subject matter. Therefore, the foregoing detailed description is not to be taken to limit claimed subject matter and/or equivalents.

What is claimed is:

1. A blade for a rotary wing aircraft, comprising:
   an outer layer defining a cavity; and
   at least one inertia insert disposed within the defined cavity,
   wherein the at least one inertia insert includes a plurality of weight segments, and a binding agent surrounding one or more of the plurality of weight segments and separating the one or more of the plurality of weight segments from a neighboring weight segment;
   wherein the one or more of the plurality of weight segments include tungsten; and
   wherein a trailing surface of at least one of the plurality of weight segments is crescent shaped and the location of the center of gravity of the blade is based on the trailing surface, and
   wherein the one or more of the plurality of weight segments are configured to flex without fracture in response to a bending moment on the blade.

2. The blade as recited in claim 1, wherein the binding agent is a resin.

3. The blade as recited in claim 2, wherein each of the plurality of weight segments includes tungsten.

4. The blade as recited in claim 3, further comprising: a fiber within the binding agent.

5. The blade as recited in claim 1, wherein the binding agent is an adhesive.

6. The blade as recited in claim 5, wherein each of the plurality of weight segments includes tungsten.

7. The blade as recited in claim 1, wherein at least one of the one or more of the plurality of weight segments has a material having a density of less than about 16.61 grams per cubic centimeter.

8. The blade as recited in claim 7, wherein the binding agent surrounds substantially all of the plurality of weight segments.

9. An insert for a helicopter blade, comprising:
   a plurality of weight segments; and
   a binding agent surrounding one or more of the plurality of weight segments and separating the one or more of the plurality of weight segments from a neighboring weight segment;
   wherein, the one or more of the plurality of weight segments include tungsten; and
   wherein a trailing surface of at least one of the plurality of weight segments is crescent shaped and the location of the center of gravity of the blade is based on the trailing surface, and
   wherein the one or more of the plurality of weight segments are configured to flex without fracture in response to a bending moment on the blade.

10. The blade as recited in claim 9, wherein the binding agent is a resin.

11. The blade as recited in claim 10, wherein each of the plurality of weight segments includes tungsten.

12. The blade as recited in claim 11, further comprising: a fiber within the binding agent.

13. The blade as recited in claim 9, wherein the binding agent is an adhesive.

14. The blade as recited in claim 13, wherein each of the plurality of weight segments includes tungsten.

15. The blade as recited in claim 9, wherein at least one of the one or more of the plurality of weight segments has a material having a density of less than about 16.61 grams per cubic centimeter.

16. The blade as recited in claim 15, wherein the binding agent surrounds substantially all of the plurality of weight segments.

* * * * *